(12) United States Patent
Sadot et al.

(10) Patent No.: US 9,537,578 B2
(45) Date of Patent: Jan. 3, 2017

(54) METHOD AND SYSTEM FOR COHERENT EQUALIZATION OF CHROMATIC DISPERSION OF OPTICAL SIGNALS IN A FIBER

(75) Inventors: Dan Sadot, Kfar Bilu (IL); Gilad Katz, Moshav Shdema (IL); Alik Gorshtein, Ashdod (IL); Omri Levi, Tel Aviv (IL)

(73) Assignee: Multiphy Ltd., Nes Ziona (IL)

( * ) Notice: Subject to any disclaimer, the term of this patent is extended or adjusted under 35 U.S.C. 154(b) by 0 days.

(21) Appl. No.: 13/515,397

(22) PCT Filed: Dec. 13, 2010

(86) PCT No.: PCT/IL2010/001046
§ 371 (c)(1),
(2), (4) Date: Jun. 12, 2012

(87) PCT Pub. No.: WO2011/073974
PCT Pub. Date: Jun. 23, 2011

(65) Prior Publication Data
US 2012/0251112 A1 Oct. 4, 2012

Related U.S. Application Data

(60) Provisional application No. 61/286,400, filed on Dec. 15, 2009.

(51) Int. Cl.
*H04B 10/06* (2006.01)
*H04B 10/61* (2013.01)

(52) U.S. Cl.
CPC .......... *H04B 10/613* (2013.01); *H04B 10/616* (2013.01)

(58) Field of Classification Search
CPC .............. H04B 10/613; H04B 10/6161; H04B 10/6162; H04B 10/61; H04B 10/614; H04B 10/63; H04B 10/64; H04B 10/6151; G02F 2/002; H04J 14/02; H04J 14/0224; H04J 14/06
See application file for complete search history.

(56) References Cited

U.S. PATENT DOCUMENTS 5,048,060 A * 9/1991 Arai et al. .................. 375/355
5,276,712 A * 1/1994 Pearson ..................... 375/360
(Continued)

FOREIGN PATENT DOCUMENTS

| CN | 101442364 A | 5/2009 |
| WO | WO 98/26544 A1 | 6/1998 |
| WO | WO 00/25447 A2 | 5/2000 |

OTHER PUBLICATIONS

International Preliminary Report on Patentability for Application No. PCT/IL10/01046 dated Mar. 13, 2012.
(Continued)

*Primary Examiner* — Ken N Vanderpuye
*Assistant Examiner* — David Lambert
(74) *Attorney, Agent, or Firm* — Alston & Bird LLP

(57) ABSTRACT

Method and system for optimally equalizing distortion of an optical data channel carrying coherent optical signals with a given analog bandwidth B. A receiving end with IQ paths receives signals and a balanced detector detects signals in each path. The bandwidth of the detected signals is reduced by a factor of N by filtering the output of each path using an AAF with a cutoff frequency optimized to the analog bandwidth 2B/N of each path, where the AAF has deterministic attributes and introducing Known ISI. The signal is sampled at the AAF output by an ADC, at a sampling rate of 2B/N. The samples of each path are post-processed by a digital processor operating at a data rate of 2B/N, where post-processing represents the compensation of the distortion and the input data stream is reconstructed by optimally decoding the output of the processor using a decoder, which compensates the ISI.

8 Claims, 3 Drawing Sheets

(56) References Cited

U.S. PATENT DOCUMENTS

| | | | |
|---|---|---|---|
| 7,031,405 B1* | 4/2006 | Touzni et al. | 375/326 |
| 7,233,632 B1* | 6/2007 | Kingston et al. | 375/327 |
| 7,522,842 B1* | 4/2009 | McNicol et al. | 398/157 |
| 2003/0175034 A1* | 9/2003 | Noe | 398/152 |
| 2004/0160661 A1* | 8/2004 | Hurrell et al. | 359/325 |
| 2005/0135475 A1* | 6/2005 | Momtaz et al. | 375/240 |
| 2007/0147850 A1* | 6/2007 | Savory et al. | 398/208 |
| 2007/0154221 A1* | 7/2007 | McNicol et al. | 398/135 |
| 2008/0085125 A1* | 4/2008 | Frankel | H04B 10/0795 398/159 |
| 2008/0226306 A1* | 9/2008 | Heffner et al. | 398/202 |
| 2009/0129787 A1 | 5/2009 | Li et al. | |
| 2009/0142077 A1* | 6/2009 | Taylor | 398/208 |
| 2009/0179790 A1 | 7/2009 | Jahangir | |
| 2010/0296819 A1* | 11/2010 | Kahn et al. | 398/208 |

OTHER PUBLICATIONS

International Search Report for Application No. PCT/IL10/01046 dated May 13, 2011.
Supplementary European Search Report for Application No. EP 10 83 7158 dated Aug. 5, 2015.
Office Action for European Application No. EP 10 837 158.4 dated Jul. 4, 2016.
Written Opinion for International Application No. PCT/IL10/01046 dated May 13, 2011.
Fludger, C. R. S. et al., *Coherent Equilization and POLMUX-RZ-DQPSK for Robust 100-GE Transmission*, Journal of Lightwave Technology, IEEE, vol. 26, No. 1, pp. 64-72.
Kahn, J. M. et al., *Advanced Modulation Formats and Digital Signal Processing in Optical Communications*, CLEO '07, 2007 Conference on Lasers and Electro-Optics (May 5-11, 2007), 2 pages.

\* cited by examiner

METHOD AND SYSTEM FOR COHERENT EQUALIZATION OF CHROMATIC DISPERSION OF OPTICAL SIGNALS IN A FIBER

FIELD OF THE INVENTION

The present invention relates to the field of coherent optical data communication. More particularly, the invention relates to a method and system for equalizing the distortion of an optical data channel, while using reduced sampling and processing rates.

BACKGROUND OF THE INVENTION

Digital compensation of Chromatic Dispersion (CD—the dependency of the phase velocity of an optical signal on its wavelength) and Polarization Mode Dispersion (PMD—modal dispersion where two different polarizations of light in a waveguide, propagate at different speeds, causing random spreading of the optical pulses) in 40 Gbp/s and 100 Gbp/s coherent optical fiber communication systems is of great interest nowadays. Today, the possibility to accurately detect not only the amplitude but also the phase of data carrying optical signals allows transmitting data by using the phase of these signals. Therefore, coherent detection and equalization allows compensating distortions that are introduced by very long fibers.

Today, sampling of optical signals in rates of 100 Gb/s is problematic, since even though the information is carried by 28 Gb/s using different polarization and splitting the data into I and Q (In-phase and Quadrature) channels, the sampling rate must be 56 Gs/s. This requires special equipment with resolution of about 5 bits, which is expensive. In addition, there is a demand for transmitting and receiving in rages of 400 Gb/s, which pushes the limits of feasible equipment even much further.

The common practice of CD and PMD compensation is to use fractional space equalizers, with two samples per symbol, or even more. It is well known that in undistorted media, sampling at the symbol rate forms sufficient information to recover the digital data. However, when the channel introduces linear distortions such as CD and PMD, a full reconstruction of the received analog signal is required in order to apply digital compensation. Sampling this signal at the symbol rate without preceding filtering violates the Nyquist sampling theorem, causing aliasing effect that results in performance degradation. On the other hand, using Anti Aliasing Filtering (AAF) prior to symbol rate sampling introduces substantial low-pass filtering which, in turn, causes substantial Inter Symbol Interference (ISI). The optimal equalizer, in the sense of minimum probability of error for a channel with ISI is the Maximum Likelihood Sequence Estimator (MLSE).

Several attempts of dealing with symbol space equalizers were made using AAF, in order to reduce cost and complexity of VLSI implementation. However, these attempts deal only with low CD values suffer from significant power penalty due to the combined effects of Aliasing and ISI.

All the methods described above have not yet provided satisfactory solutions to the problem of optimally equalizing the distortion of an optical data channel, while using reduced sampling and processing rates.

It is therefore an object of the present invention to provide a method and system for optimally equalizing the distortion of an optical data channel, while using reduced sampling and processing rates.

Another object of the present invention is to provide a method and system for equalizing the distortion of an optical data channel, without the need for expensive sampling and processing equipment.

It is a further object of the present invention to provide a method and system for equalizing the distortion of an optical data channel, while introducing low power penalties.

Other objects and advantages of the invention will become apparent as the description proceeds.

SUMMARY OF THE INVENTION

The present invention is directed to a method for optimally equalizing the distortion (such as CD or PMD) of an optical data channel carrying coherent optical signals with a given analog bandwidth B. A receiving end having an I path and a Q path is provided, for receiving the optical signals and for detecting the optical signals in each path by a balanced detector. The bandwidth of the detected optical signals is reduced by a factor of N by filtering the output of each path using an AAF with a cutoff frequency which corresponds to N (and is optimized to the analog bandwidth 2B/N of each path), where the AAF has deterministic attributes and introducing known ISI. The signal is sampled at the output of each AAF by an ADC, at a sampling rate of 2B/N. Then the samples of each path are post processed by a digital processor operating at a data rate of 2B/N, such that the post processing represents the compensation of the distortion and the input data stream is reconstructed by optimally decoding the output of the processor using a decoder (such as an MLSE, a linear equalizer, a non-linear equalizer or an FFE), which is capable of optimally compensating the introduced ISI.

The decoder may be used to compensate for amplitude and phase distortions.

Preferably, the AAF may be optimized to the analog bandwidth 2B/N of each path.

The present invention is directed to a system for optimally equalizing the distortion (such as CD or PMD) of an optical data channel carrying coherent optical signals with a given analog bandwidth B, which comprises:

a) a receiving end with an I path and a Q path, for receiving the optical signals and for detecting the optical signals in each path by a balanced detector;

b) an AAF for each path with a cutoff frequency which corresponds to N, for reducing the bandwidth of the detected optical signals in the path by a factor of N by filtering the output of each path;

c) an ADC sampling the signal at the output of each AAF at a sampling rate of 2B/N;

d) a digital post processing unit operating at a data rate of 2B/N for post processing the samples of each path by, such that the post processing represents the compensation of the distortion; and e) a decoder (such as an MLSE, a linear equalizer, a non-linear equalizer or an FFE) that is capable of optimally compensating the introduced ISI for reconstructing the input data stream by optimally decoding the output of the processor.

The post processing unit may comprise:

a) a CD equalizer, implemented in time or in frequency domain, for restoring the signal before the channel;

b) a clock recovery unit, for retiming the received signal;

c) a Polarization De-multiplexer, for compensating the PMD effect and de-multiplexing the two different data streams that were modulated according to the dual polarization format;

c) an Intermediate Frequency Estimator, for restoring the intermediate frequency;

d) a Carrier Phase Estimator, for restoring the phase of the optical carrier; and e) an output equalizer, for compensating the deterministic ISI introduced by the AAF in each path.

BRIEF DESCRIPTION OF THE DRAWINGS

The above and other characteristics and advantages of the invention will be better understood through the following illustrative and non-limitative detailed description of preferred embodiments thereof, with reference to the appended drawings, wherein.

DETAILED DESCRIPTION OF PREFERRED EMBODIMENTS

The present invention proposes a coherent detection method and system with a single sample per symbol and allows lowering the information bandwidth, the sampling rate and the processing rate with very low losses regarding Optical Signal-To-Noise Ratio (OSNR). The bandwidth is reduced by Anti-Aliasing Filtering (AAF), followed by an MLSE, which is used to compensate the ISI introduced by the anti-aliasing filtering. 50,000 ps/nm of CD is fully compensated with only 1 dB penalty. The combination of AAF and MLSE allows full equalization with one sample per symbol of transmission of 111 Gbps over CD of up to 50,000 ps/nm, with only 1 dB of OSNR degradation.

Figure 1A:
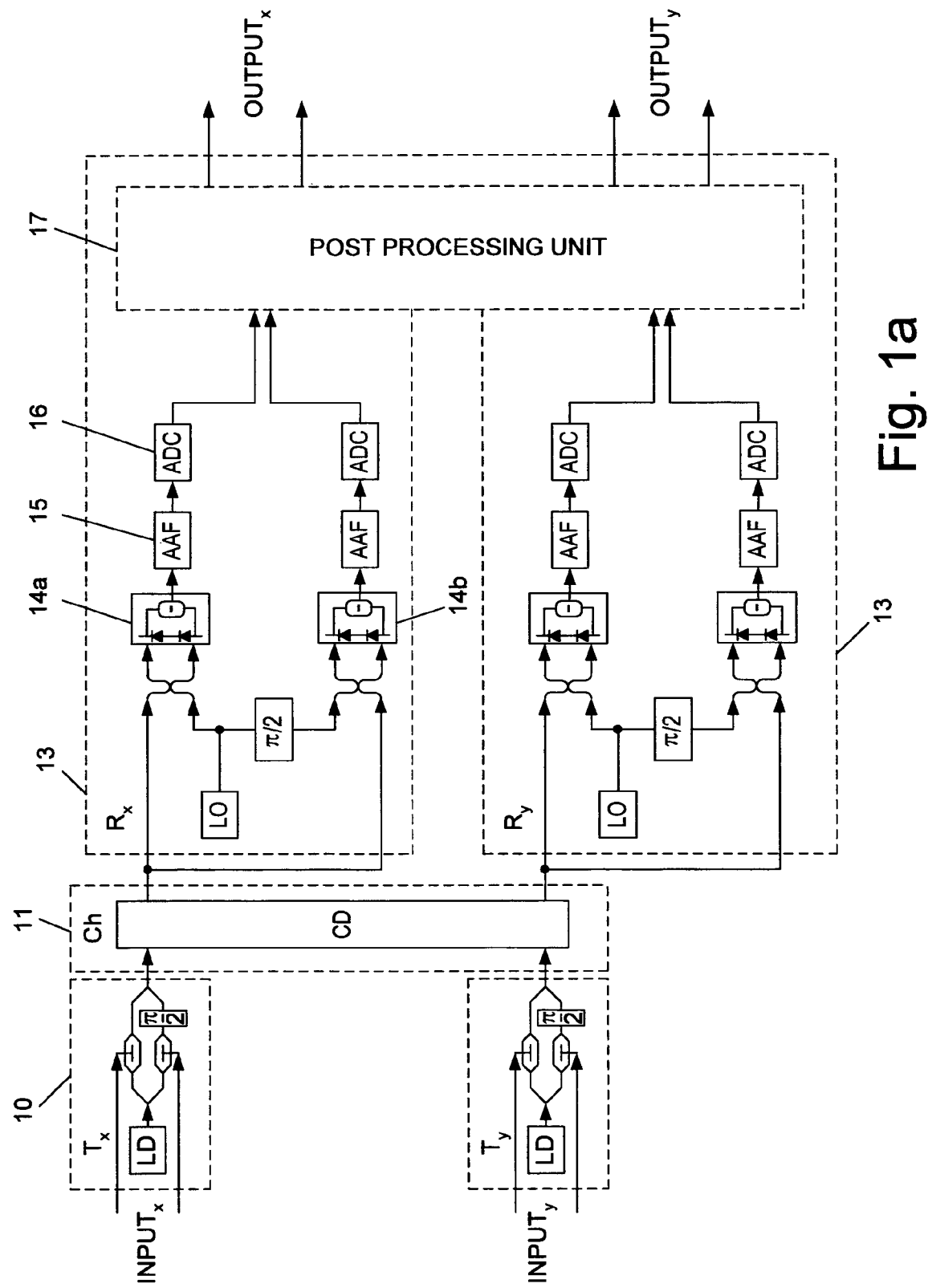
FIG. 1a is a block diagram of a system for optimally equalizing the distortion of an optical data channel, according to an embodiment of the present invention.

FIG. 1a is a block diagram of a system for optimally equalizing the distortion of an optical data channel, according to an embodiment of the present invention. This example depicts a single polarization-channel model out of the simulated Dual-Polarization Quadrature Phase Shift Keying (DP-QPSK) 111 Gbp/s system. Only a single polarization-channel is examined (including both in-phase and quadrature components) at a baud (symbols per second) rate of 27.75 Gbaud.

The system comprises conventional optical transmitter 10 and an optical receiving end (front end) 12 of the receiver 13. The optical channel 11 is assumed to be linear with chromatic dispersion. The front end comprises a local oscillator for frequency down-conversion. The output of the balanced detector 14a corresponds to an in-phase (I) component and the output of the balanced detector 14b corresponds to a quadrature (Q) component.

Each output is followed by an AAF 15 for filtering the output of each path. The AAF 15 can be modeled by a 5th order Butterworth low pass filter, which reduces the analog bandwidth (BW) of the signal at each path by a factor of N, while introducing known and deterministic ISA with deterministic attributes. The cutoff frequency of the AAF 15 corresponds to N.

The signal at each path (at the output of each AAF) is sampled and quantized by an Analog to Digital Converter (ADC) 16 at a sampling rate of 2BW/N Giga-samples/sec (in this case, 27.75 Giga-samples/sec) with 5-bit resolution. The two I and Q paths are fed to a post processing unit 17, which performs digital post processing on the samples of each path in a processing rate which is reduced by a factor of N, as well. The post processing unit 17 (the processing of which represents the compensation of the distortion, which may include amplitude and phase distortions) inverts the frequency response of the channel and applies the inverse of the channel to the received signal, so as to restore the signal before the channel), and can be implemented either in the time or in the frequency domain. The final stage of the post processing unit is a decision block. The optimal decision algorithm is based on MLSE. It compensates for the deterministic ISI introduced by the AAF 15 in each path, and performs the best theoretically possible decision.

Figure 1B:
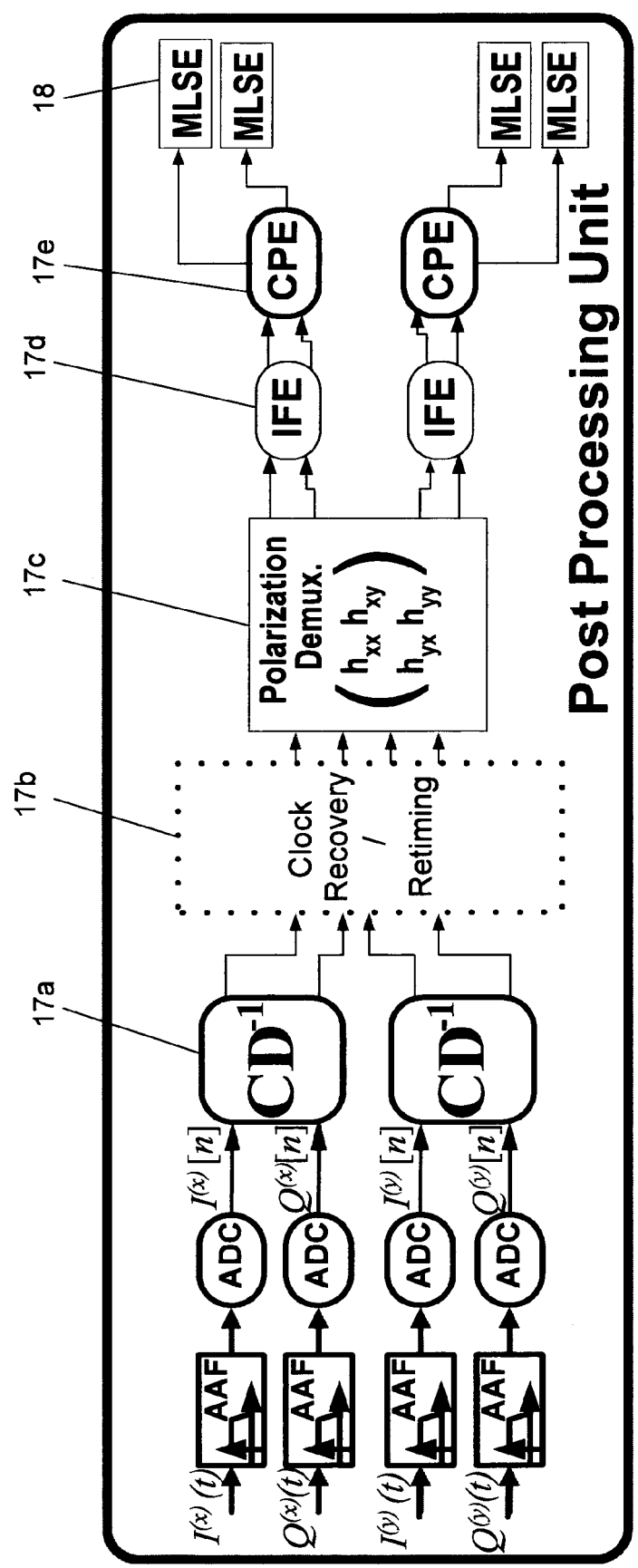
FIG. 1b illustrates a possible implementation of the post processing unit, according to one embodiment

FIG. 1B illustrates a possible implementation of the post processing unit 17, according to one embodiment. The post processing unit 17 may include:

a CD equalizer 17a (CD-1 in FIG. 1b), which is designed according to a zero forcing criterion (linear equalization for restoring the signal before the channel) and can be implemented either in the time or in the frequency domain;

a clock recovery unit 17b for retiming the received signal;

a Polarization De-multiplexer 17c for compensating the PMD effect and de-multiplexing the two different data streams that were modulated according to the dual polarization format;

an IFE (Intermediate Frequency Estimator) 17d for restoring and cancelling the intermediate frequency;

a CPE (Carrier Phase Estimator) 17e for restoring the phase of the optical carrier; and an output decoder 18 (which may be for example a 16 state MLSE or alternatively, a Feed Forward Equalizer (FFE) with 13 taps using least mean squares (LMS) criterion), in order to compensate the deterministic ISI introduced by the AAF 15 in each path.

The input data stream is reconstructed by optimally decoding the output of the processor using the output decoder 18, which can optimally compensate the introduced ISI.

All these units operate in 1 Sample/symbol (as opposed to prior art that uses higher Samples/symbol rates).

Several simulations have been performed, in order to determine the optimal AAF bandwidth to ensure a BER value of 10-3. In these simulations, 200,000 bits are used to ensure sufficient statistics for bit error rate (BER) of 10-3. Histogram estimation method is used for channel estimation with training sequence of 50,000 observations, which are subsequently discarded from BER calculation.

Figure 2A:
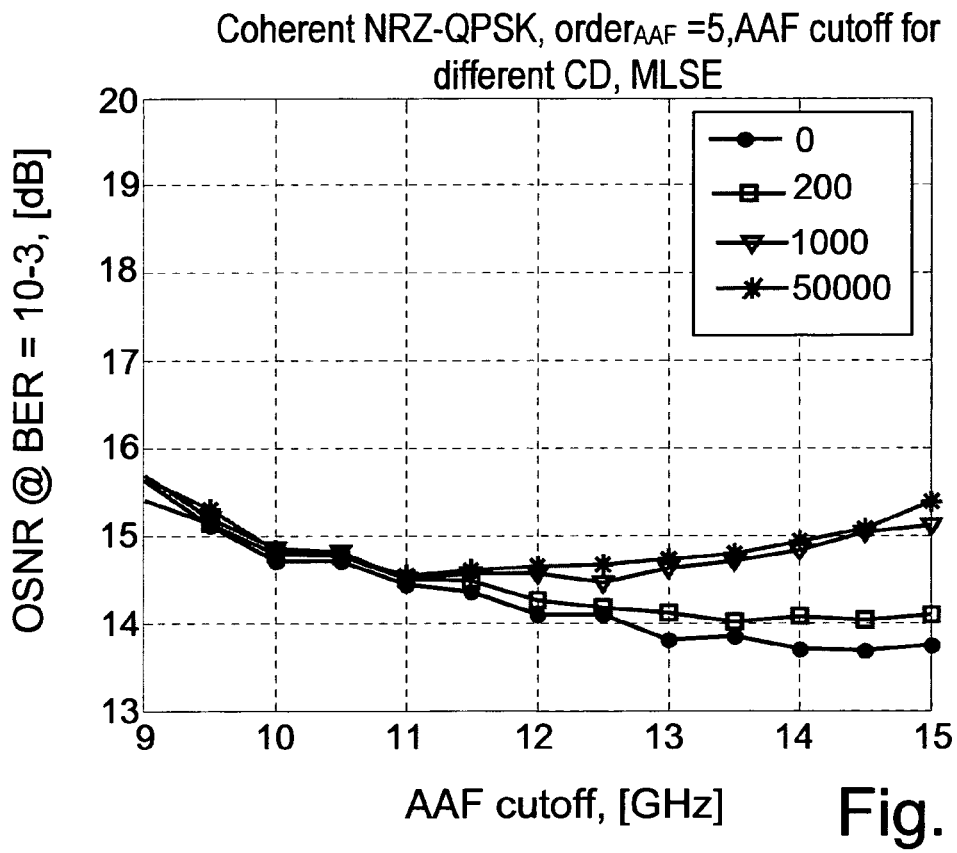
FIG. 2a illustrates the ONSR required for 10-3 BER as a function of AAF cutoff frequency, obtained using an MLSE decoder.

FIG. 2a illustrates the ONSR required for 10-3 BER as a function of AAF cutoff frequency, obtained using an MLSE decoder, for several fiber lengths. It can be seen that the proposed system with an MLSE decoder allows full compensation of CD, up to 50,000 ps/nm. Furthermore, the ISI that is introduced by the AAF is completely compensated with an OSNR degradation of 1 dB only, as compared to the case of back to back (B-t-B) transmission. While the B-t-B system with 19 GHz AAF cutoff frequency requires 13.7 dB of OSNR for BER of 10-3, the case of CD=50,000 ps/nm reaches the same BER value with 14.7 dB of OSNR. Also, for AAF cutoff frequency values higher than 11 G Hz, the aliasing effect leads to performance degradation which can not be compensated by the MLSE, emphasizing the requirement of using an AAF in a symbol-spaced sampling system.

Figure 2B:
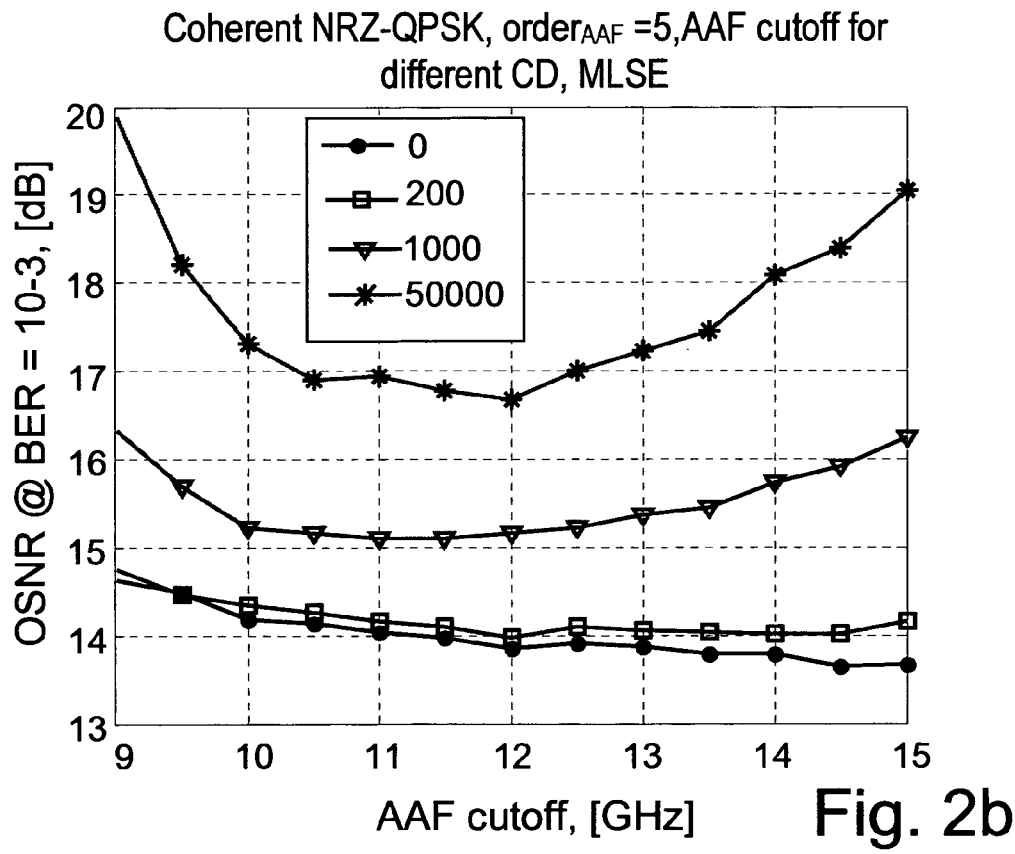
FIG. 2b illustrates the ONSR required for 10-3 BER as a function of AAF cutoff frequency, obtained using an FFE decoder.

FIG. 2b illustrates the ONSR required for 10-3 BER as a function of AAF cutoff frequency, obtained using an FFE decoder, for several fiber lengths. It can be seen that for high CD values, the system performance is severely degraded, despite the fact that optimal sampling phase is used.

FIGS. 2a and 2b show that the MLSE is insensitive to sampling phase in a symbol-spaced system, i.e., a system with 1 Sample/symbol. The proposed scheme of symbol-spaced sampler enables the use of 27.75 Giga-samples/sec ADCs in 111 Gbps coherent digitally equalized system with full compensation of chromatic dispersion. PMD can be fully compensated in a similar manner. In addition, it allows significant VLSI hardware relaxation, reduced power consumption, and reduced cost.

The above examples and description have of course been provided only for the purpose of illustration, and are not intended to limit the invention in any way. As will be appreciated by the skilled person, the invention can be carried out in a great variety of ways, employing more than one technique from those described above, all without exceeding the scope of the invention.

The invention claimed is:

1. A system for optimally equalizing distortion of an optical data channel carrying coherent optical signals with a given analog bandwidth B1 [GHz] and a symbol rate of B2 [GSymbols/sec], comprising:
   a) an Anti-Aliasing Filter with a cutoff frequency which corresponds to N, for reducing the bandwidth of detected optical signals by a factor of N by filtering said optical signals;
   b) an Analog to Digital Converter for sampling said optical signals at the output of said Anti-Aliasing Filter using a single sample per symbol and
   c) a digital post processing unit with a processor operating at a processing rate being equal to a sampling rate and to the symbol rate, for:
      c.1) inverting a frequency response of said channel and applying an inverse of the channel to said received optical signals, to compensate for channel distortions, except for an Inter Symbol Interference (ISI) introduced by said Anti-Aliasing Filter;
      c.2) post processing the samples, such that said digital post processing represents compensation of said distortion; and wherein said digital post processing unit comprises a decoder being capable of reconstructing an input data stream by optimally compensating known deterministic Inter Symbol Interference, introduced by said Anti-Aliasing Filter, and reconstructing an input data stream and to optimally decode the output of said processor;
   said digital processing unit comprises:
      a) a Chromatic Dispersion equalizer, implemented in time or in frequency domain, for restoring a signal before the channel;
      b) a clock recovery unit, for retiming a received signal;
      c) a Polarization De-multiplexer, for compensating Polarization Mode Dispersion effects and de-multiplexing different data streams that were modulated according to the dual polarization format;
      d) an Intermediate Frequency Estimator, for restoring an intermediate frequency;
      e) a Carrier Phase Estimator, for restoring a phase of the optical carrier; and
      f) an output equalizer, for compensating deterministic Inter Symbol Interference introduced by the Anti-Aliasing Filter.

2. A system according to claim 1, in which the distortion of the data channel is Chromatic Dispersion.

3. A system according to claim 1, in which the distortion of the data channel is Polarization Mode Dispersion.

4. A system according to claim 1, in which the decoder is a Maximum Likelihood Sequence Estimator.

5. A system according to claim 1, in which the decoder is selected from a group consisting of:
   a linear equalizer;
   a non-linear equalizer.

6. A system according to claim 1, in which the decoder compensates for amplitude and phase distortions.

7. A system according to claim 1, in which the Anti-Aliasing Filter is optimized to an analog bandwidth of 2B/N.

8. A system according to claim 1, in which the output equalizer selected from a group consisting of:
   a linear equalizer;
   a non-linear equalizer.

* * * * *

UNITED STATES PATENT AND TRADEMARK OFFICE
CERTIFICATE OF CORRECTION

| | |
|---|---|
| PATENT NO. | : 9,537,578 B2 |
| APPLICATION NO. | : 13/515397 |
| DATED | : January 3, 2017 |
| INVENTOR(S) | : Sadot et al. |

It is certified that error appears in the above-identified patent and that said Letters Patent is hereby corrected as shown below:

On the Title Page

Item (75) Inventors: "Omri Levi" should read --Omri Levy--.

Signed and Sealed this
Twelfth Day of September, 2017

Joseph Matal
*Performing the Functions and Duties of the
Under Secretary of Commerce for Intellectual Property and
Director of the United States Patent and Trademark Office*